Aug. 5, 1958     L. LEITZ ET AL     2,845,842
MICROPHOTOGRAPHIC APPARATUS
Original Filed Nov. 3, 1953     2 Sheets-Sheet 2
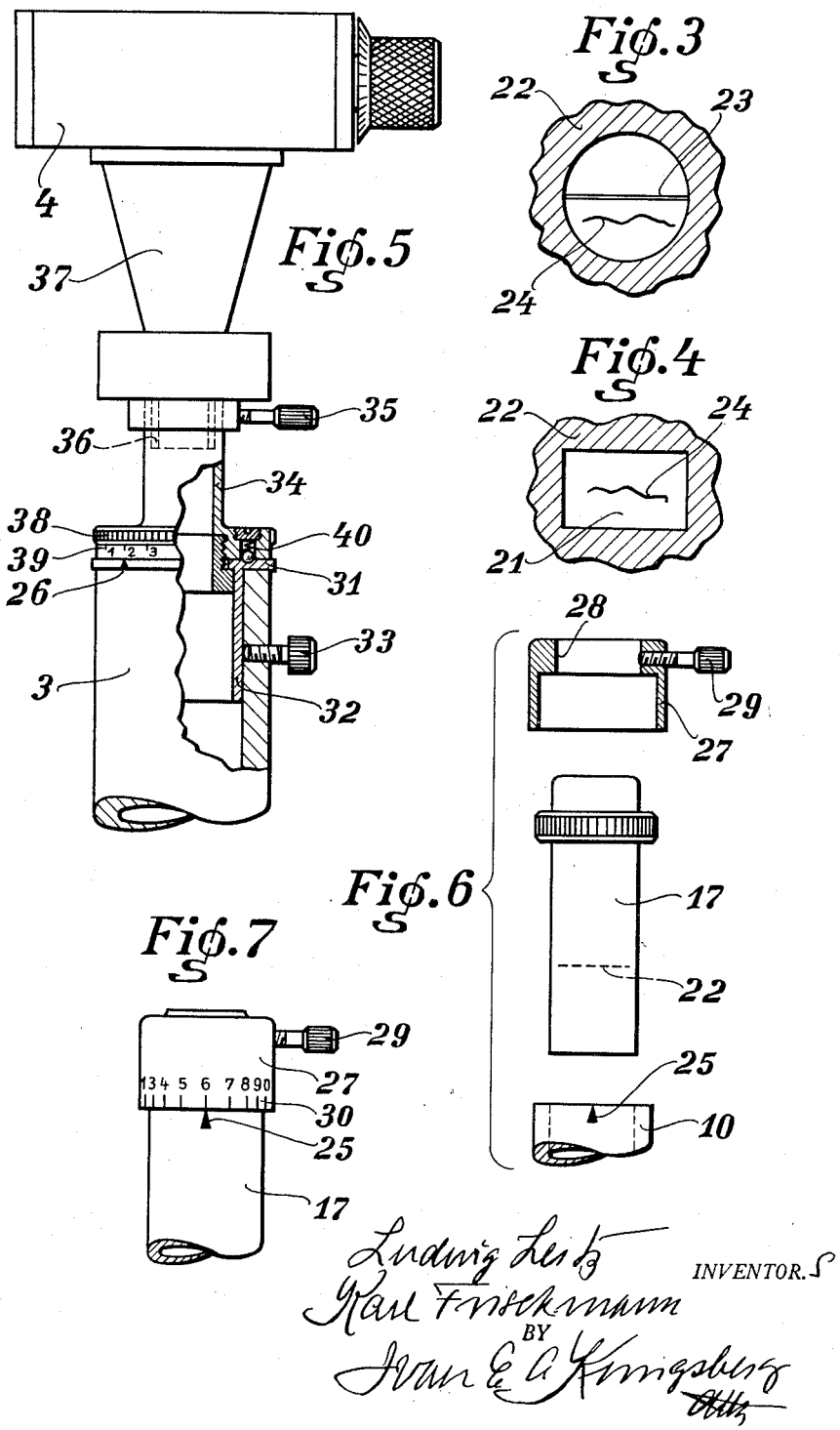

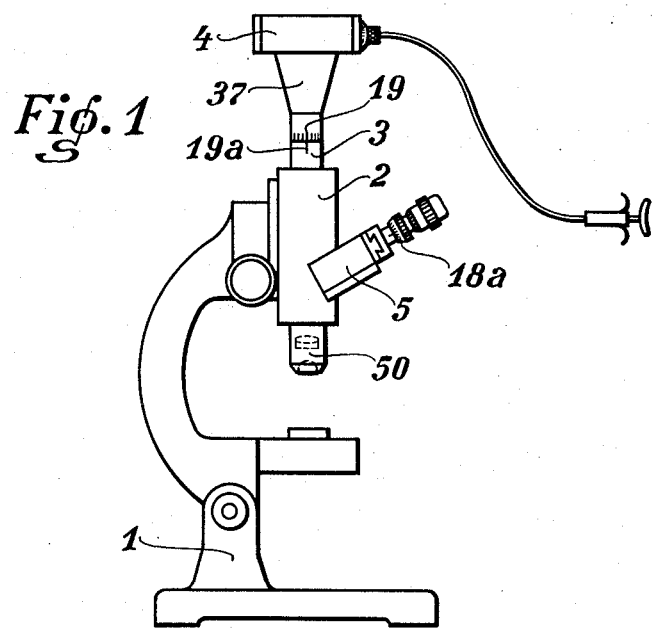
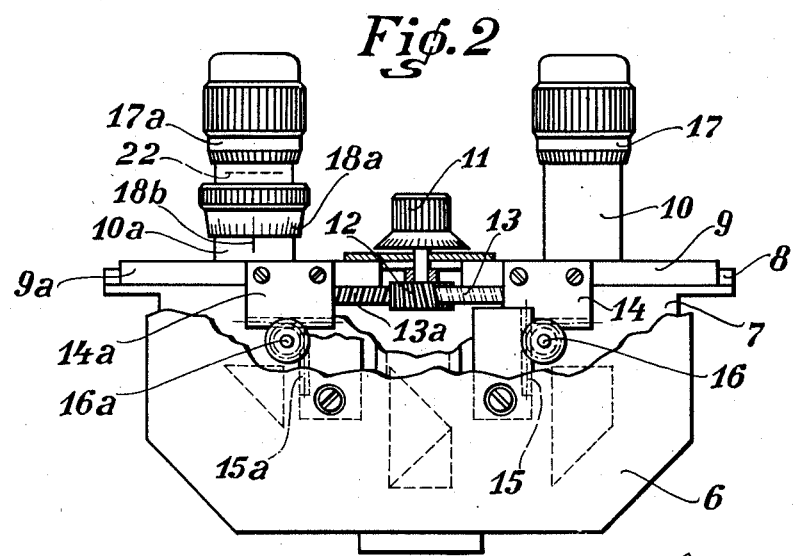

United States Patent Office 2,845,842
Patented Aug. 5, 1958

2,845,842

MICROPHOTOGRAPHIC APPARATUS

Ludwig Leitz and Karl Frischman, Wetzlar, Germany, assignors to Ernest Leitz G. m. b. H., a corporation of Germany Continuation of abandoned application Serial No. 390,027, November 3, 1953. This application November 30, 1956, Serial No. 625,551

5 Claims. (Cl. 88—24)

This application is a continuation of our pending application Serial Number 390,627, filed November 3, 1933, now abandoned, for improvements in microphotographic apparatus for photographing an object in such a position that the longest dimension of the object is parallel to the longest side of the film or plate in the camera.

When it is desired to photograph an object in a microscope it has been proposed to provide the microscope with a separate support for the camera so as to avoid detaching the miscroscope ocular unit and replace it with the camera. In a binocular microscope one of the ocular tubes may be used for suporting the camera, but if the object is to be observed with both eyes, i. e. using both oculars, then a special camera support must be provided.

The film or plate which is commonly used in cameras is rectangular in form and it is desirable to utilize such form particularly if the object has a somewhat similar shape. The camera must therefore be adjustable so that the long side of the film or plate be positioned parallel with the longest dimension of the particular object. It is not desirable or practical merely to adjust the object angularly by rotation of the object stage because the center of the object is not always coaxial with the center of the stage.

The object of this invention is therefore to provide a microphotographic apparatus in which the object may be examined with one or both oculars and adjusted for such examination with a corresponding adjustment of the camera to suit the film or plate therein. The apparatus is provided with a diaphragm having an opening of the same shape as the film or plate, or a mark may be used for this purpose.

Both the ocular and the camera are angularly adjustable to as the same degree by providing both parts with corresponding similar scales. However, since the angular adjustments of the two parts must be exactly alike, difficulties arise when a binocular microscope is involved because the usual binocular tubes are laterally adjustable to suit the pupillary distance of the user and thereby alter the distance between the oculars and the microscope objective. This distance is not always the same as the distance between the microscope objective and the camera objective. The bonocular microscope must therefore include an arrangement whereby the distance between oculars and microscope objective remains constant when the oculars are laterally relatively adjusted. Such an arrangement must be included in a microscope which provides for angular adjustment of both camera and ocular which is provided with the specified diaphragm for the purpose aforesaid.

Accordingly the invention is embodied in a microphotographic apparatus arranged as hereinafter set forth and as illustrated in the accompanying drawings, in which—

Fig. 1 is a side view of an apparatus embodying the invention.

Fig. 2 is a detail view, partly broken away, of the ocular unit.

Fig. 3 shows a mark placed in an ocular in the image field of the object therein.

Fig. 4 shows a diaphragm having a rectangular opening.

Fig. 5 shows in section an arrangement to be used on existing microscopes for adjusting the camera.

Fig. 6 is an exploded view of the arrangement to be used on existing microscopes for adjusting the ocular.

Fig. 7 is an assembly view of the parts shown in Fig. 6.

As shown in Fig. 1, the microscope stand 1 carries a housing 2 with an upstanding neck 3 for the support of the camera 4. The housing 2 includes an inclined extension 5 which supports the ocular unit. The microscope objective is indicated at 50. The ocular unit may be monocular or binocular. It is shown in Fig. 2 as comprising an outer casing 6 and an inner prism housing 7 for support of the usual prisms, shown in dotted lines and not especially numbered. The housing 7 contains a rail 8 which supports two slidable ocular bases 9, 9a, which carry the ocular tubes 10, 10a. A knob 11 is provided for laterally adjusting the distance between the oculars 17, 17a. The knob 11 turns a gear 12 which meshes with two toothed racks 13, 13a which are secured to the slidable bases 9, 9a, respectively. The latter also carries horizontally disposed toothed racks 14, 14a. The outer casing 6 carries vertically disposed toothed racks 15, 15a which are geared to the racks 14, 14a by the gears 16, 16a, respectively.

When the hand knob 11 is operated to adjust the distance between the oculars 17, 17a to suit the pupillary distance of the user, the inner housing 7 with the oculars 17, 17a is raised or lowered within the casing 6 so that the optical distance between the oculars and the microscope objective remains constant.

At least one ocular is provided with a diaphragm 22 having an opening 21 which corresponds in shape to that of the film or plate used in the camera. The diaphragm 22 is located in the image field of the microscope in the rotatable ocular 17a and the object 24 is seen within the opening 21 as shown. Or, as in Fig. 3, a mark 23 may be used to indicate the adjustment.

By rotating the ocular 17a within the fixed ocular tube 10a, the long side of the opening 21, or the mark 23, may be moved into parallelism with the longest dimension of the object. The camera then must be similarly adjusted so that the longest side of the picture will be parallel with the longest dimension of the object. The degree of angular adjustment of the diaphragm 22 may be read upon the scale 18a on the rotatable ocular 17a with reference to a fixed mark 18b on the non-rotatable tube 10a.

The camera 4 has secured thereto a light proof extension 37 which is rotatably inserted in the camera supporting neck 3 and carries a scale 19 similar to the scale 18a. The neck 3 has a mark 19a. By rotating the extension 37 with the camera 4 to the same extent as shown by the scale 18a on the mark 18b, the camera will be so angularly adjusted that the long side of the film or plate will be parallel to the longest dimension of the object, i. e., the angular adjustments of the ocular and the camera will be the same.

The invention includes means whereby the above same adjustments may be provided on existing microscopes or such as are in use. The existing ocular tube 10, Figs. 6 and 7, will be provided with a mark 25 and the ocular 17 containing the diaphragm 22 is inserted in the tube 10 and carries a nipple 27 secured by a screw 29 to the ocular 17. The nipple bears a scale 30 and is open at 28 for observing the diaphragm. The angular adjustment of the ocular 17 is then read off on the scale 30 with reference to the mark 25.

The camera will also be provided with scale means for angular adjustment. To the upstanding camera supporting neck 3, Fig. 5, there will be secured a connecting scale member comprising a lower tube 32 secured to the neck by a screw 33. The tube 32 has a flange 31 with a scale mark 26. The flange supports a scale ring 38 with a scale 39. An upper tube 34 is screwed into the scale ring 38 and rotates within the fixed tube 32, there being a friction means as at 40 between the two parts. The upper tube 34 receives the neck 36 of the light proof extension 37 of the camera and is secured by a screw 35.

The upper tube 34 with the scale ring 38 supports the camera and these parts are thus rotatable within the lower fixed tube 32, to an extent which may be read off on the scale 39 and the mark 26. The angular adjustment of the camera will then be equalized to the angular adjustment of the ocular 17 with the diaphragm 22 as seen on the scale 30 and the mark 25.

The invention therefore provides a microphotographical apparatus in which the microscope oculars may be adjusted to suit the pupillary distance of the user while maintaining the optical distance to the microscope objective and in which the camera is similarly angularly adjusted to suit the longest or any other desired dimension of the object by scale means on the camera and on the ocular unit. The invention also embodies means to the same purpose as applied to existing microscopes.

We claim:

1. A microphotographic apparatus for photographing an object under observation in such a position that the longest dimension of the object appears substantially parallel with the longest side of the exposed film or plate used in the camera comprising in combination, a microscope, a camera, means for supporting said camera on said microscope to rotate thereupon about the optical axis of the microscope, an ocular unit in said microscope including a fixed ocular tube and an ocular tube rotatably supported in said fixed tube, a diaphragm in said rotatable ocular tube having a diaphragm opening for observing the object, said diaphragm opening being of substantially the same shape as that portion of the camera film or plate upon which the object is to be photographed, means for rotating said diaphragm containing rotatable ocular tube within said fixed tube to place the longest side of said diaphragm opening substantially parallel with the longest dimension of the object, visible scale means on said fixed and on said rotatable ocular tubes to indicate the extent of rotation of said rotatable tube within said fixed tube, said camera supporting means comprising a light proof extension on the camera rotatably engaging a fixed camera tube on the microscope for positioning, by rotation of the camera and said light proof extension, the longest side of the camera film or plate in the same position with relation to the object as that of said diaphragm opening and visible scale means on said camera light proof extension and on said microscope camera tube for indicating the extent of rotation of the camera to be the same as the extent of rotation of said rotatable diaphragm ocular tube with relation to the object as indicated by the aforesaid scale means on the said fixed and rotatable tubes.

2. The combination according to claim 1 in which the said diaphragm is supported in said rotatable ocular tube in the image field of the ocular.

3. The combination according to claim 1 in which the said rotatable ocular tube is provided with a mark in the image field of the said ocular.

4. The combination according to claim 1 including a diaphragm supporting tube detachably inserted in the ocular tube of the microscope, said diaphragm having an opening, means on said diaphragm tube for indicating the angular position of the diaphragm opening therein with relation to the object, a separate scale member detachably connected to and between said camera and said microscope for suporting the camera in rotatable angularly adjusted position with relation to the object and scale means on said separate scale member for indicating the angular position of the camera film or plate with relation to the position of the object.

5. A microphotographic apparatus for photographing an object under observation in such a position that the longest dimension of the object appears substantially parallel with the longest side of the film or plate used in the camera comprising in combination, a binocular microscope, a camera rotatably mounted on said microscope to rotate about the optical axis of the microscope, an ocular unit in said microscope including two ocular tubes laterally movable upon said ocular unit, a diaphragm in one of said ocular tubes having an opening of substantially the same shape as that of the film or plate used in the camera, means for rotating said diaphragm containing ocular tube to place the diaphragm opening therein with its longest side substantially parallel with the longest dimension of the object, scale means on the ocular unit indicating the extent of rotation of said ocular tube necessary for the purpose aforesaid, means for rotating said camera to position the same angularly so that the camera film or plate occupies the same position with relation to the object as that of the said diaphragm opening, scale means on said microscope and said camera for indicating the extent to which said camera is to be rotated and means in the ocular unit for adjusting the interpupillary distance between the ocular tubes without altering the optical distance between the said oculars and the microscope objective.

References Cited in the file of this patent

UNITED STATES PATENTS

| | | |
|---|---|---|
| 1,788,645 | Velten | Jan. 13, 1931 |
| 2,209,532 | Michel | July 30, 1940 |
| 2,719,468 | Steiner | Oct. 4, 1955 |